United States Patent [19]
Stiteler et al.

[11] 3,976,541
[45] Aug. 24, 1976

[54] SECONDARY COOLANT PURIFICATION SYSTEM WITH DEMINERALIZER BYPASS

[75] Inventors: Fred Zwald Stiteler, New Hartford; James Phillip Donohue, Rockville, both of Conn.

[73] Assignee: Combustion Engineering, Inc., Windsor, Conn.

[22] Filed: Mar. 18, 1974

[21] Appl. No.: 452,225

[52] U.S. Cl. .................. 176/37; 176/38; 176/40; 176/65; 176/92 R
[51] Int. Cl.² .......................... G21C 19/32
[58] Field of Search .............. 176/37, 38, 65, 92 R; 60/DIG. 4

[56] References Cited
UNITED STATES PATENTS

| | | | |
|---|---|---|---|
| 3,184,390 | 5/1965 | Ellard | 176/65 X |
| 3,380,889 | 4/1968 | Loose | 176/65 X |
| 3,400,049 | 9/1968 | Wolfe | 176/40 X |
| 3,488,254 | 1/1970 | Davey et al. | 176/38 X |
| 3,625,817 | 12/1971 | Anderson | 176/38 |
| 3,630,839 | 12/1971 | Podolsky | 176/65 X |
| 3,700,550 | 10/1972 | Shiells | 176/37 X |

OTHER PUBLICATIONS
Power Engineering, vol. 61, No. 4, Apr. 1957, p. 86.
Power, Eng'g. and Mgt. Sect., Sept. 1955, pp. 75–81.

Primary Examiner—Stephen C. Bentley
Assistant Examiner—Peter A. Nelson
Attorney, Agent, or Firm—Stephen L. Borst

[57] ABSTRACT

Apparatus and method are provided for a nuclear stream supply system for adequately controlling the chemistry of the secondary coolant. The invention includes means for the addition of volatile chemicals, a full flow condensate demineralizer, continuous blowdown capability, radiation detection means, a condensate demineralizer bypass line, and an auxiliary demineralizer sized to handle full blowdown flow. The auxiliary demineralizer is cut into the system and the steam generator feedwater flow is bypassed around the full flow condensate demineralizer whenever radioactivity is detected in the secondary coolant.

13 Claims, 1 Drawing Figure

U.S. Patent  Aug. 24, 1976  3,976,541
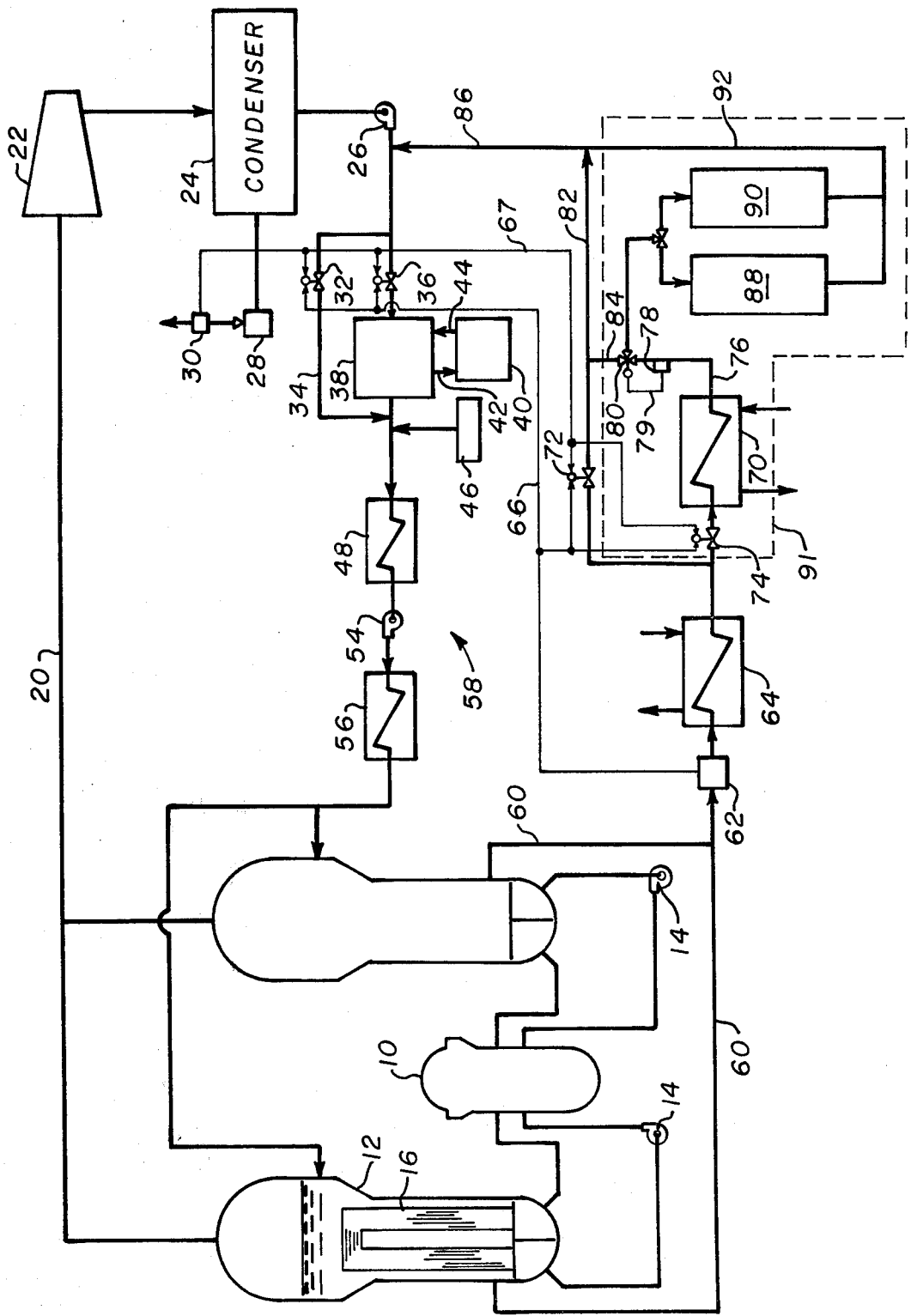

SECONDARY COOLANT PURIFICATION SYSTEM WITH DEMINERALIZER BYPASS

BACKGROUND OF THE INVENTION

This invention relates to the purification and decontamination of the secondary coolant of nuclear steam supply system.

In a pressurized water reactor equipped with steam generators that have both liquid and vapor phases, any impurities entering the generators in the feedwater have a tendency to concentrate in the liquid phase. Contaminants in the secondary coolant originate from a number of sources including: feedwater makeup water, corrosion of the secondary system, condenser leakage, steam generator tube leakage, and residue from manufacture and assembly and subsequent cleanups of the steam generator. Several problems occur when contaminants are concentrated to an excessive degree in the steam generator. One danger is that the contaminants tend to plate out on the heat transfer surfaces and tend to settle out on horizontal areas. This results in the formation of scale and layers of crud which decrease the efficiency of heat transfer processes thereby decreasing the heat transfer performance of the steam generator. In addition the formation of scale and crud deposits can have an even greater effect on the steam generators. Recent industry experience and laboratory test results indicate that impurity deposits can act to accelerate the corrosion of steam generator heat exchange tubes. Corrosion of the steam generator tubes is undesirable since excessive corrosion results in steam generator tube failure which allows the leakage of the pressurized radioactive primary coolant into the secondary system thereby contaminating the secondary coolant. Therefore, it is desirable to exclude feedwater impurities from the steam generator liquid phase. It is also desirable to have a system which can remove both radioactive and non-radioactive contaminants from the secondary coolant without incurring excessive cost.

Since solid contaminants have such a pronounced effect on the integrity of the steam generator heat exchange tubes, every attempt should be made to exclude all solids from the steam generators. It has been conventional in the past to attempt to prevent impurity collection in the steam generator by periodically blowing down the steam generator liquid to a holding tank for delivery to a waste treatment facility. Another conventional prior art method has been to add solid chemicals to the coolant for the purpose of combining with the dissolved impurities in the steam generator feedwater to produce a particulate precipitant. The particulate was then later removed by filtration and/or ion exchange. Neither of these prior art systems has proved to be successful in preventing steam generator deposits and subsequent steam generator corrosion. Both approaches allow the collection of solid impurities in the steam generators for at least a short period of time. Therefore, plating out and crud deposition occur regardless of the clean up efforts.

SUMMARY OF THE INVENTION

The present invention combines the attributes of volatile chemical addition, continuous blowdown, and full flow condensate demineralization to yield a greatly simplified and economically attractive system for the control of steam generator contaminants. During normal plant operation (defined as no primary to secondary leakage) condensate from the condenser is pumped through a full flow condensate demineralizer system by the condensate pumps. Volatile chemical additions are made to the secondary coolant to control both the pH and oxygen concentration of the coolant without the unnecessary formation of solids. Dissolved solids resulting from condenser leakage and suspended solids resulting from system corrosion are removed in the condensate polishers by ion exchange and/or filtration. At the same time a continuous blowdown of approximately 1 percent of the main steaming rate of the steam generators is maintaned. Radiation detectors monitor the secondary coolant for radioactive contaminants which indicate the presence of a primary to secondary leak in the steam generator. If these monitors indicate no primary to secondary leakage, the blowdown is cooled and returned directly to the condensate pump discharge. Thus, any contaminants in the blowdown fluid are removed when the condensate passes through the condensate demineralizers.

If one of the radiation monitors should indicate a primary to secondary leak, several operations are initiated. First, a signal is sent diverting the condensate flow from the condensate demineralizer system to a bypass line around the condensate demineralizers. Next, the flow control valves to an auxiliary blowdown heat exchanger are opened, thereby, delivering the blowdown flow to an auxiliary blowdown ion exchanger system. A temperature controller at the outlet of the heat exchanger controls a second bypass valve which diverts blowdown flow from the blowdown ion exchanger. When the temperature of the effluent exiting from the blowdown heat exchanger is compatible with the resin specifications of the ion exchangers, the bypass valve causes the blowdown flow to pass through the blowdown ion exchangers, thereby effectively cleaning the blowdown flow and eliminating serious contaminant concentration in the fluid phase of the steam generator.

BRIEF DESCRIPTION OF THE DRAWINGS

FIG. 1 is a schematic illustration of a nuclear steam supply system showing the steam generator feedwater train, and means for purifying the secondary coolant of the system.

DESCRIPTION OF THE PREFERRED EMBODIMENT

Referring now to FIG. 1, the core of a nuclear reactor 10 is cooled by a coolant which is circulated to steam generator 12 and which is returned to the reactor 10 by primary coolant pump 14. The primary coolant is circulated through heat exchange tubes 16 in steam generator 12 in out-of-contact heat exchange relationship with a secondary coolant that circulates around the outside of heat exchange tubes 16. By means of this heat exchange, secondary coolant is converted from water into steam and the steam is then delivered via steam conduit 20 to turbine 22. After the steam has passed through the turbine it is condensed in main condenser 24 to its liquid state. In the condenser 24 the noncondensible fractions in the coolant are separated from the condensate and ejected from the main condenser's hot well through the condenser vacuum system 28 or through a system commonly referred to as the air ejection vent. Next, the condensate is circulated by condensate pumps 26 through a full flow condensate demineralizer system 38, which is a commercially available and well understood system. Upstream of the full-flow condensate demineralizers 38 is a flow regulation valve 36 and a bypass line 34 which straddles the condensate demineralizers 38 and which is in turn regulated by bypass valve 32. Downstream of the condensate demineralizers 38 and downstream of the reentrance of the bypass line 34 is a chemical injection means 46. At this position volatile chemicals, such as ammonia and hydrazine, are injected into the feedwater flow stream. After the addition of the appropriate chemicals, the condensate or feedwater passes through a low pressure feedwater heater system 48, main feed pump 54 and high pressure feedwater heater system 56, before being delivered back to the steam generators 12.

In order for the full flow condensate demineralizers 38 to operate continuously on the full flow of the feedwater delivered to steam generators 12, provision must be made for continuously regenerating the resin of the condensate demineralizers 38. Thus, external regeneration system 40 with incoming lines 42 and outgoing lines 44 is included as indicated in FIG. 1. Conduits 42 and 44 withdraw the spent resin from the condensate demineralizer and return regenerated resin after it has been regenerated by the external regeneration system 40.

It has been found that even the condensate demineralization of the full flow of the feedwater delivered to the steam generators, the steam generators still have a tendency to concentrate impurities in the feedwater that either pass through the condensate demineralizers or result from corrosion in the secondary feedwater chain 58 upstream of the steam generator. As a result, it has been found that in order to eliminate concentration of these impurities a continuous blowdown of the steam generator secondary side should be maintained. This invention discloses a continuous blowdown of a pair of steam generators, the blowdown amounting to 1 percent of the steaming rate of both steam generators. The blowdown lines from the two steam generators 12 are indicated by piping 60. During normal operation, the blowdown which is siphoned off by piping 60 is cooled by blowdown heat exchanger 64 and then passed through lines 82 and 86 back to a point which is upstream of the full flow condensate demineralizers 38 but downstream of the condensate pump 26. In this manner, the impurities which are concentrated by the steam generators 12 are drawn off from the steam generators and continuously subjected to the condensate demineralizers 38, thereby reducing or eliminating the impurity concentration which tends to occur in the steam generator.

The system and mode of operation described above are sufficient for cleaning the secondary coolant and minimizing contamination buildup in the steam generators during normal operation of the nuclear steam supply system, but are insufficient to cope with the abnormal operation of one or more failed steam generator tubes which allow the leakage of radioactive primary coolant into the normally nonradioactive secondary coolant. The inherent defect of the above described system during such abnormal operation is that the full flow condensate demineralizer resin bed becomes contaminated with radioactive contaminants. Ordinarily the resin regeneration system 40 is not equipped to handle radioactive wastes. Inclusion of a resin regeneration system which could handle radioactive wastes would be extremely expensive and would lie unused during the greater part of the life of the plant. An alternative solution to this radioactivity problem would be to dispose of the resin as it becomes radioactive. This, however, is an unattractive solution inasmuch as the resin beds involved are very expensive and the volume of radioactive waste resin required to be disposed of would be large.

It is a particularly novel aspect of this invention that provision is made to avoid the contamination of the condensate demineralizer resin. This is accomplished by bypass line 34 and bypass valve 32 in combination with flow control valve 36. Radiation monitors are located on the air ejection system 28 in order to monitor the carryover of any radioactivity from the steam generator and on the blowdown line 60 in order to detect any radioactivity which is passed through the blowdown line. Upon detection of radioactivity in excess of a predetermined allowable level by blowdown line monitor 62 or air ejection vent monitor 30, a signal is sent by electrical conductor 66 or by electrical conductor 67 to the actuation means of bypass valve 32 and flow control valve 36. These valves 32 and 36 are quick acting valves so that valve 36 shuts and valve 32 opens in relatively short order and the contaminated fluid is passed around the full flow condensate demineralizers. In this manner, the resin bed of the condensate polisher is protected from being radioactive. It should be noted that one might expect the radiation monitor 62 to receive an indication of a primary to secondary leak in advance of radiation monitor 30 if a leak in heat exchange tubes 16 were to occur relatively low on one of the heat exchange tubes 16. The opposite would be the case, i.e., radiation monitor 30 could be expected to receive an indication of radioactivity before radiation monitor 62, if the leak between the primary and secondary systems through tubes 16 were to occur in a relatively high position on one of the tubes 16.

A further aspect of this invention is the auxiliary ion exchanger system, generally indicated by 91, which includes a multiplicity of blowdown ion exchangers 88 and 90 having throw-away resin beds. Throw-away resin beds enable the secondary system to be cleaned of its radioactivity component in a relatively simple and inexpensive manner by allowing the radioactive fluid to pass only to the auxiliary ion exchangers, and not through the full flow condensate demineralizers 38. This avoids the radioactive contamination of the full flow condensate demineralizers while also assuring that serious impurity concentration in steam generator is avoided. As a result, the nuclear steam supply system can remain in operation, without jeopardizing the steam generators and a mandatory and inconvenient shutdown can be avoided. Therefore, this invention increases the flexibility of the nuclear steam supply system operator's response to a steam generator tube failure and thereby increases plant availability.

The auxiliary ion exchanger system 91 consists of auxiliary blowdown heat exchanger 70, bypass valve 74, temperature detector 78, valve 80 and a plurality of blowdown ion exchangers 88 and 90. Upon receipt of a signal from the radiation monitors, the appropriate actuating devices open valve 74 and close valve 72. This action diverts the blowdown flow from its normal path leading to the full flow condensate polisher 38 to the auxiliary ion exchange system 91. It should be noted that the actuation devices of valves 72 and 74 are slow acting so that the transfer of the blowdown coolant is not made abruptly to ensure that the auxiliary blowdown heat exchanger is protected against severe thermal shock. The radioactive blowdown is passed through the auxiliary blowdown heat exchanger 70 where it is cooled to a temperature which is compatible with the temperature requirements of the blowdown ion exchangers 88 and 90. Temperature detector 78 monitors the temperature of the blowdown exiting from the heat exchanger 70 and operates bypass valve 80 via electrical conductor 79. Prior to the blowdown coolant attaining a sufficiently low temperature, the bypass valve 80 passes the coolant through conduit 76 and spur conduit 84 to conduit 82 and 86 and to the bypass line 34. As a result, the radioactive fluid passes around the full flow condensate demineralizers 38. When the blowdown coolant has attained a sufficiently low temperature, the temperature detector 78 sends an activation signal to bypass valve 80 and the flow is diverted through the blowdown ion exchangers 88 and/or 90. The blowdown ion exchangers 88, 90 pass the radioactive coolant through a throw-away resin bed to perform radioactive contaminant removal. Subsequent to this cleaning action the coolant is returned through conduit 92 back to the secondary feedwater train 58. It should be noted here that blowdown ion exchangers 88 and 90 are state of the art pieces of equipment, and are sized to individually take the full flow of the blowdown, so that the full blowdown flow can be passed through one of the ion exchangers while the resin bed in the other ion exchanger is being replaced. In this manner and due to the present invention the nuclear reactor steam supply system is allowed to continue operation even though a steam generator heat exchange tube has failed. In this way the radioactive contamination of the secondary coolant is tolerated without the necessity of an immediate forced outage. Thus, the plant operating personnel can continue to operate the plant without further jepardizing the steam generator and can wait until a scheduled plant shutdown to repair or plug the steam generator heat exchange tubes. This represents additional plant flexibility and can amount to a substantial savings by avoiding excessive forced plant shutdowns.

What is claimed is:

1. In combination with a nuclear reactor cooled by a primary coolant which is circulated in an out-of-contact heat exchange relationship with a secondary coolant in a steam generator having primary and secondary sides and in combination with a secondary coolant system including said steam generator, a turbine, a condenser, and a condensate pump, the improvement comprising:
    a. a condensate demineralizer downstream of said condenser for demineralizing said secondary coolant;
    b. a bypass line straddling said condensate demineralizer; and
    c. means in said secondary coolant system for diverting a portion of said secondary coolant around said condensate demineralizer.

2. The improvement as recited in claim 1 further including:
    a. means for the detection of the level of radioactivity of said secondary coolant; and
    b. means for actuating said secondary coolant diverting means when said detection means indicates a level of radioactivity of said secondary coolant which exceeds a predetermined level.

3. The improvement as recited in claim 1 further including:
    a. means providing fluid communication between said secondary side of said steam generator and said secondary coolant system upstream of said condensate demineralizer for blowing down the secondary side of said steam generator.

4. The improvement as recited in claim 3 further including:
    a. means for the detection of radioactivity of said secondary coolant; and
    b. means for actuating said secondary coolant diverting means when said detection means indicates a level of radioactivity of said secondary coolant which exceeds a predetermined level.

5. Improvement as recited in claim 3 further including:
    a. a blowdown demineralizer connected in a flow path parallel to said blowdown means; and
    b. means in said secondary coolant system for diverting to said demineralizer the blowdown coolant flow passing through said blowdown means.

6. The improvement as recited in claim 5 further including:
    a. means for the detection of the level of radioactivity of said secondary coolant; and
    b. means for actuating said secondary coolant diverting means and said blowdown diverting means when said detection means indicates a level of radioactivity of said secondary coolant which exceeds a predetermined level.

7. The improvement as recited in claim 1 further including:
    a. means for injecting volatile chemicals into said secondary coolant for chemistry control of said secondary coolant.

8. The improvement as recited in claim 3 further including:
    a. heat exchange means in said blowdown means for cooling the blowdown coolant flow.

9. Improvement as recited in claim 5 further including:
    a. heat exchange means upstream of said blowdown demineralizer for cooling said blowdown coolant flow prior to its delivery to said blowdown demineralizer;
    b. a spur conduit connecting said blowdown means and said flow path parallel to said blowdown means, one end of which being made intermediate said heat exchange means and said blowdown demineralizer;
    c. flow regulation means operatively connected to said spur conduit and said flow path parallel to said blowdown means for selectively diverting a portion of the flow to said heat exchange means from said spur conduit to said blowdown demineralizer; and
    d. temperature sensing control means responsive to the temperature of the blowdown coolant flow exiting from said heat exchange means and operatively connected to said flow regulation means for selectively passing said blowdown coolant flow through said spur conduit or through said blowdown demineralizer.

10. The method of operating a secondary coolant system of a nuclear steam supply system which includes a steam generator with primary and secondary sides, a turbine, a condenser, a condensate pump, and a means for demineralizing said coolant, the method comprising the steps of:
    a. demineralizing the secondary coolant; and b. diverting said coolant around the demineralizer when said coolant becomes radioactive.

11. The method as recited in claim 10 further including the steps of:
   a. continuously blowing down the secondary side of said steam generator; and
   b. demineralizing the blowdown coolant extracted from said steam generator before returning said blowdown coolant to said steam generator.

12. The method as recited in claim 11 wherein said step of demineralizing said blowdown coolant includes the steps of:
   a. monitoring the radioactivity of said secondary coolant;
   b. demineralizing said blowdown coolant in an auxiliary demineralizer when said secondary coolant is radioactive; and
   c. bypassing said auxiliary demineralizer when said secondary coolant is not radioactive.

13. The method as recited in claim 12 further including the steps of:
   a. cooling said blowdown coolant upstream of said auxiliary demineralizer when said coolant is being passed to said demineralizer
   b. monitoring the temperature of said cooled blowdown coolant; and
   c. diverting said cooled coolant around said auxiliary demineralizer when the temperature of said blowdown coolant is incompatible with said auxiliary demineralizer and diverting said cooled coolant to said auxiliary demineralizer when the temperature of said blowdown coolant is compatible with said auxiliary demineralizer.

* * * * *